(12) United States Patent
Izhar et al.

(10) Patent No.: US 11,347,395 B2
(45) Date of Patent: *May 31, 2022

(54) CACHE MANAGEMENT SYSTEM AND METHOD

(71) Applicant: EMC IP HOLDING COMPANY LLC, Hopkinton, MA (US)

(72) Inventors: Amnon Izhar, Brookline, MA (US); Patrick J. Weiler, Northborough, MA (US)

(73) Assignee: EMC IP HOLDING COMPANY, LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/813,114

(22) Filed: Mar. 9, 2020

(65) Prior Publication Data

US 2020/0210068 A1 Jul. 2, 2020

Related U.S. Application Data

(63) Continuation of application No. 15/365,320, filed on Nov. 30, 2016, now Pat. No. 10,592,115.

(51) Int. Cl.
*G06F 3/06* (2006.01)
*G06F 12/0866* (2016.01)

(52) U.S. Cl.
CPC ............ *G06F 3/061* (2013.01); *G06F 3/0652* (2013.01); *G06F 3/0685* (2013.01); *G06F 12/0866* (2013.01); *G06F 2212/217* (2013.01)

(58) Field of Classification Search
CPC ...... G06F 3/061; G06F 3/0652; G06F 3/0685; G06F 12/0866
See application file for complete search history.

(56) References Cited

U.S. PATENT DOCUMENTS

| | | |
|---|---|---|
| 10,019,362 B1 | 7/2018 | Chatterjee et al. |
| 10,592,115 B1 | 3/2020 | Izhar et al. |
| 2005/0223018 A1 | 10/2005 | Forin et al. |
| 2009/0100215 A1 | 4/2009 | Nochimowski |
| 2011/0066808 A1 | 3/2011 | Flynn |
| 2011/0222685 A1 | 9/2011 | Kim et al. |
| 2011/0258391 A1 | 10/2011 | Atkisson |
| 2012/0210041 A1 | 8/2012 | Flynn |
| 2012/0239860 A1 | 9/2012 | Atkisson |
| 2015/0089138 A1 | 3/2015 | Tao |
| 2015/0178203 A1 | 6/2015 | Torrant |
| 2016/0092352 A1 | 3/2016 | Camp et al. |
| 2016/0283110 A1 | 9/2016 | Jain et al. |
| 2018/0107592 A1 | 4/2018 | Hashimoto |

OTHER PUBLICATIONS

Non-Final Office Action issued in related U.S. Appl. No. 15/365,320 dated May 31, 2018.
Final Office Action issued in related U.S. Appl. No. 15/365,320 dated Oct. 10, 2018.

(Continued)

*Primary Examiner* — Ryan Bertram
(74) *Attorney, Agent, or Firm* — Brian J. Colandreo; Mark H. Whittenberger; Holland & Knight LLP

(57) ABSTRACT

A method, computer program product, and computing system for receiving a plurality of data streams on an SSD cache memory system associated with a backend storage system and writing a first of the plurality of data streams to a first portion of the SSD cache memory system.

14 Claims, 4 Drawing Sheets

(56) References Cited

OTHER PUBLICATIONS

Non-Final Office Action issued in related U.S. Appl. No. 15/365,320 dated Feb. 11, 2019.
Final Office Action issued in related U.S. Appl. No. 15/365,320 dated Jun. 27, 2019.
Notice of Allowance issued in related U.S. Appl. No. 15/365,320 dated Nov. 14, 2019.
Advisory Action issued in U.S. Appl. No. 15/365,320 dated Sep. 13, 2019.

CACHE MANAGEMENT SYSTEM AND METHOD

CROSS-REFERENCE TO RELATED APPLICATIONS

The subject application is a continuation of U.S. application Ser. No. 15/365,320; filed Nov. 20, 2016. The entire disclosure of which is herein incorporated by reference.

TECHNICAL FIELD

This disclosure relates to storage systems and, more particularly, to RAID-based storage systems.

BACKGROUND

Storing and safeguarding electronic content is of paramount importance in modern business. Accordingly, various methodologies may be employed to protect such electronic content. Examples of such methodologies may include storing such electronic content on data storage systems that provide a high level of data availability, examples of which may include but are not limited to RAID arrays, redundant servers, storage appliances, and network attached storage devices. In order to further enhance performance, such system may utilize cache memory systems to provide quicker access to such electronic content.

SUMMARY OF DISCLOSURE

In one implementation, a computer-implemented method is executed on a computing device and includes receiving a plurality of data streams on an SSD cache memory system associated with a backend storage system and writing a first of the plurality of data streams to a first portion of the SSD cache memory system.

One or more of the following features may be included. A second of the plurality of data streams may be written to a second portion of the SSD cache memory system. The first portion of the SSD cache memory system may include a first erase block within the SSD cache memory system. The second portion of the SSD cache memory system may include a second erase block within the SSD cache memory system. The first portion of the SSD cache memory system may be erased. Prior to erasing the first portion of the SSD cache memory system, any uncommitted data within the first portion of the SSD cache memory system may be written to the backend storage system. Prior to erasing the first portion of the SSD cache memory system, any currently-utilized data within the first portion of the SSD cache memory system may be relocated to another portion of the SSD cache memory system.

In another implementation, a computer program product resides on a computer readable medium and has a plurality of instructions stored on it. When executed by a processor, the instructions cause the processor to perform operations including receiving a plurality of data streams on an SSD cache memory system associated with a backend storage system and writing a first of the plurality of data streams to a first portion of the SSD cache memory system.

One or more of the following features may be included. A second of the plurality of data streams may be written to a second portion of the SSD cache memory system. The first portion of the SSD cache memory system may include a first erase block within the SSD cache memory system. The second portion of the SSD cache memory system may include a second erase block within the SSD cache memory system. The first portion of the SSD cache memory system may be erased. Prior to erasing the first portion of the SSD cache memory system, any uncommitted data within the first portion of the SSD cache memory system may be written to the backend storage system. Prior to erasing the first portion of the SSD cache memory system, any currently-utilized data within the first portion of the SSD cache memory system may be relocated to another portion of the SSD cache memory system.

In another implementation, a computing system including a processor and memory is configured to perform operations including receiving a plurality of data streams on an SSD cache memory system associated with a backend storage system and writing a first of the plurality of data streams to a first portion of the SSD cache memory system.

One or more of the following features may be included. A second of the plurality of data streams may be written to a second portion of the SSD cache memory system. The first portion of the SSD cache memory system may include a first erase block within the SSD cache memory system. The second portion of the SSD cache memory system may include a second erase block within the SSD cache memory system. The first portion of the SSD cache memory system may be erased. Prior to erasing the first portion of the SSD cache memory system, any uncommitted data within the first portion of the SSD cache memory system may be written to the backend storage system. Prior to erasing the first portion of the SSD cache memory system, any currently-utilized data within the first portion of the SSD cache memory system may be relocated to another portion of the SSD cache memory system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
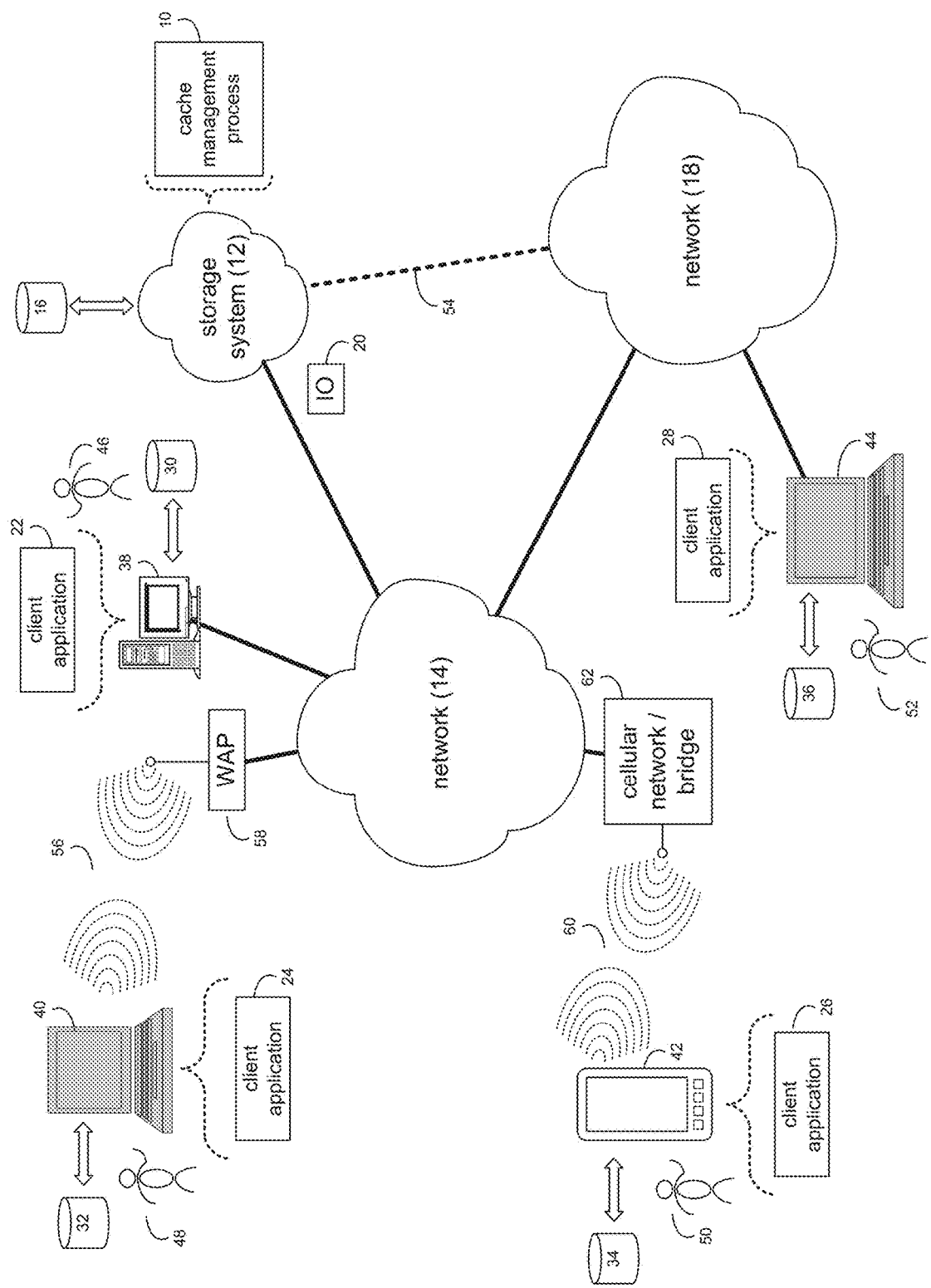
FIG. 1 is a diagrammatic view of a storage system and a cache management process coupled to a distributed computing network.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
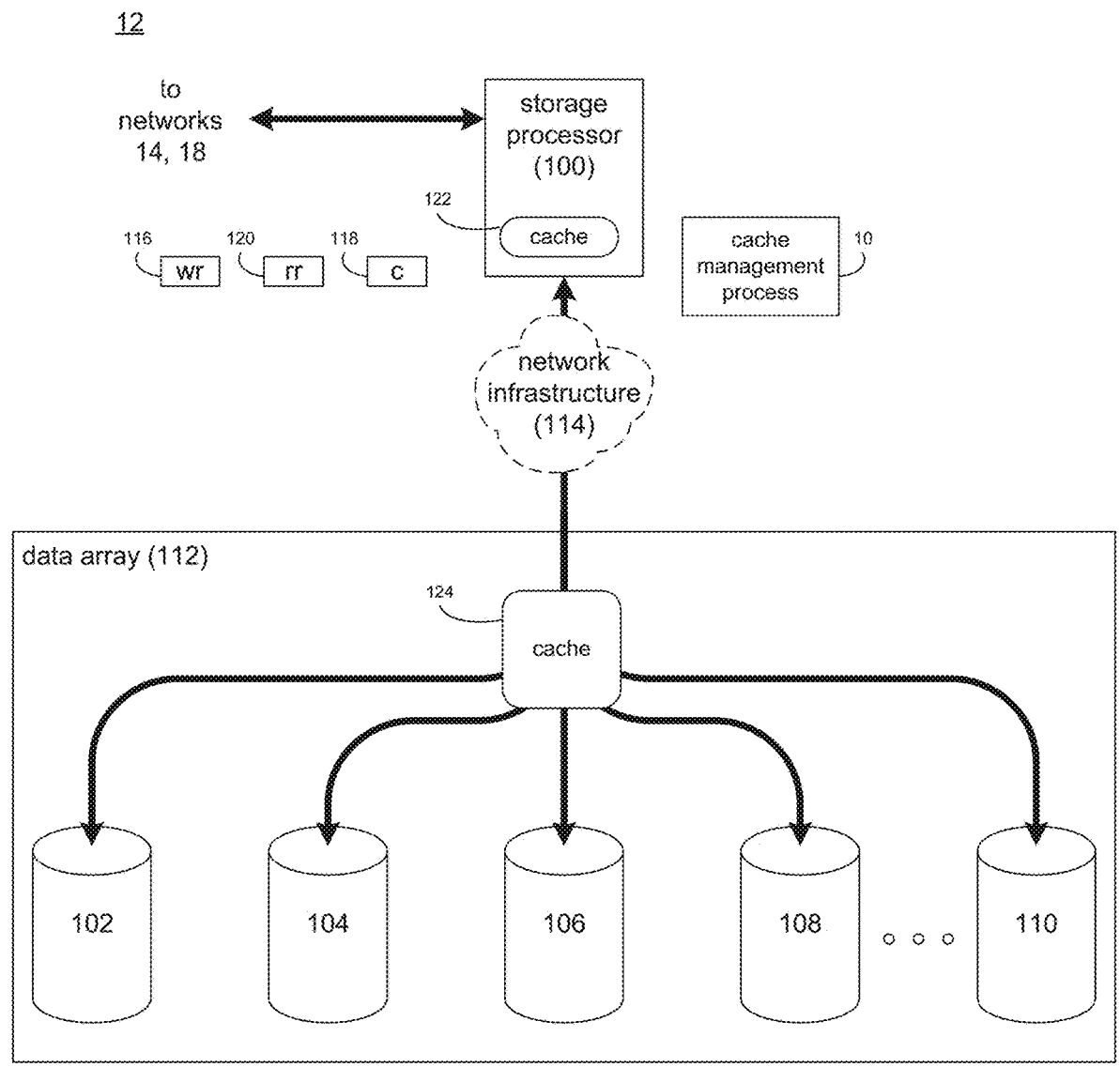
FIG. 2 is a diagrammatic view of the storage system of FIG. 1.

Storage System:

Referring also to FIG. 2, there is shown a general implementation of storage system 12. In this general implementation, storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., an SSD, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., an SSD, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of cache management process 10 may be executed by one or more processors (not shown) and one or more memory architectures (not shown) included within data array 112.

Figure 3:
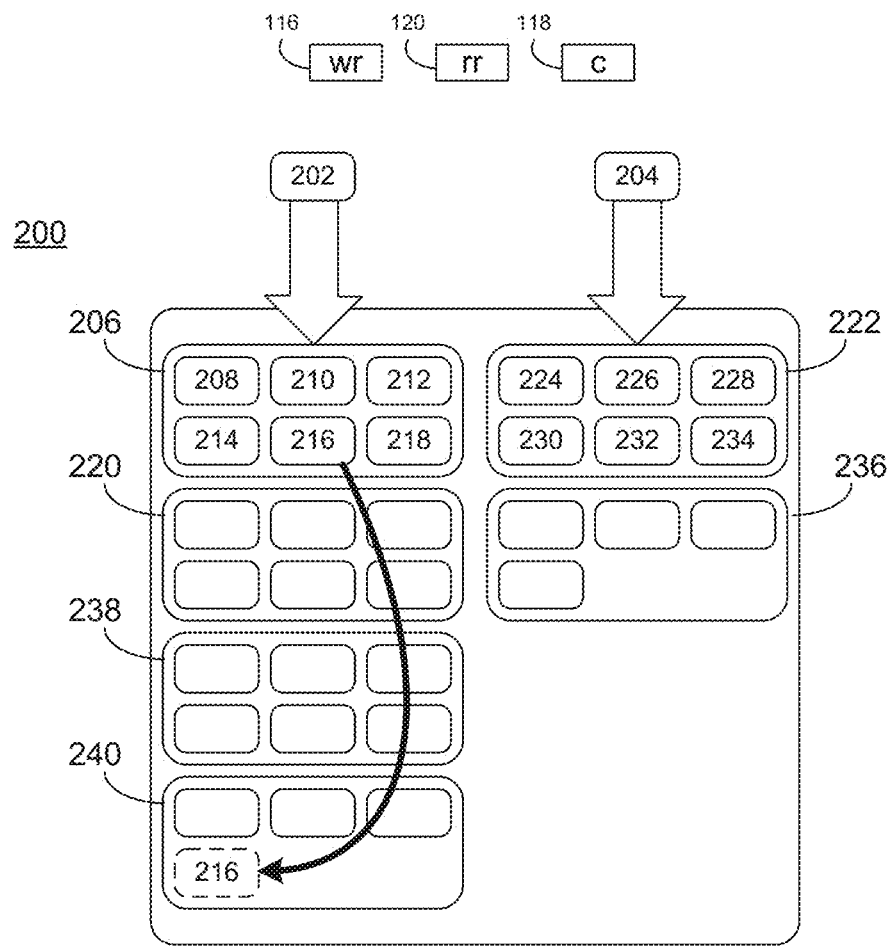
FIG. 3 is a diagrammatic view of an SSD cache memory system included within the storage system of FIG. 1.
Figure 4:
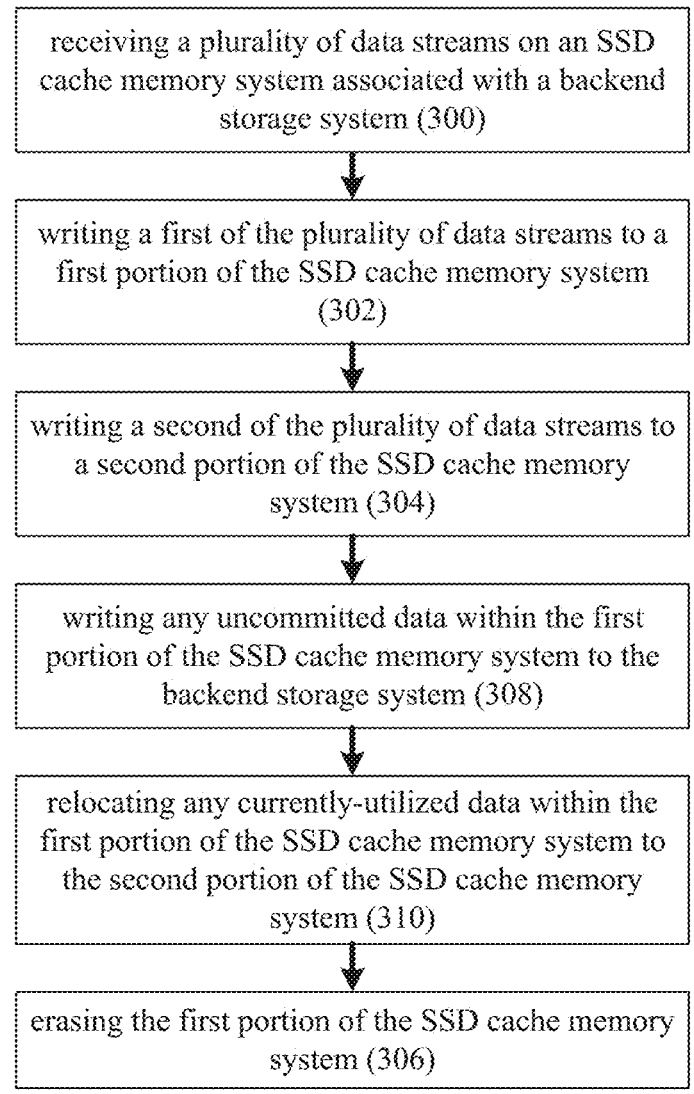
FIG. 4 is a flow chart of the cache management process of FIG. 1.

The Cache Management Process:

Referring also to FIGS. 3-4, there is shown a diagrammatic view of SSD cache memory system 200, examples of which may include but are not limited to frontend cache memory system 122 and/or backend cache memory system 124 within storage system 12.

As discussed above, various IO requests may be generated with respect to storage system 10. For example, these IO requests may be sent from client applications 22, 24, 26, 28 to storage system 12. Additionally/alternatively and when storage processor 100 is configured as an application server, these IO requests may be internally generated within storage processor 100. Examples of these IO requests may include but are not limited to data write request 116 (i.e. a request that content 118 be written to storage system 12) and data read request 120 (i.e. a request that content 118 be read from storage system 12).

Accordingly and as discussed above, when content 118 is being written to storage system 12, content 118 may first be written to SSD cache memory system 200 (e.g., frontend cache memory system 122 and/or backend cache memory system 124) prior to being written to plurality of storage targets (e.g. storage targets 102, 104, 106, 108, 110) within storage system 12. Conversely, when content 118 is being read from storage system 12, storage system 12 may first attempt to retrieve content 118 from SSD cache memory system 200 (e.g., frontend cache memory system 122 and/or backend cache memory system 124) prior to reading content 118 from the plurality of storage targets (e.g. storage targets 102, 104, 106, 108, 110) within storage system 12.

For the following example, assume that during use of SSD cache memory system 200 by various users (e.g., users 46, 48, 50, 52), various data streams may be established. For example, assume that user 46 is utilizing and accessing storage system 12 resulting in the generation of data stream 202. Further, assume that user 48 is utilizing and accessing storage system 12 resulting in the generation of data stream 204. As each of data streams 202, 204 is from a unique and distinct user (e.g., users 46, 48 respectively), each of these data streams (e.g., data streams 202, 204) includes data that has similar "attributes", in that the data within a particular data stream may have a similar "time of life" (which will be discussed below in greater detail).

Accordingly, cache management process 10 may receive 300 a plurality of data streams (e.g., data streams 202, 204) on SSD cache memory system 200 associated with a backend storage system. In this particular example, the backend storage system may be e.g., data array 112 when SSD cache memory system 200 is frontend cache memory system 122 and may be the plurality of storage targets (e.g. storage targets 102, 104, 106, 108, 110) when SSD cache memory system 200 is backend cache memory system 124.

When writing data to SSD cache memory system 200, the write operation may need to write the data in predefined portions that have a minimum defined size. For example and when writing data to SSD cache memory system 200, such a minimum defined size may be a 4 kilobyte cache page. Accordingly, if during a write operation, a single 512 byte data block is being written to SSD cache memory system 200, this 512 byte data block may still consume a 4 kilobyte cache page. However, if the single write operation concerns the writing of eight 512 byte data blocks, these eight 512 byte data blocks may be written to a single 4 kilobyte cache page.

The same typically is true when reading data from SSD cache memory system 200, wherein data needs to be read a 4 kilobyte cache page at a time.

One of the challenges of using SSD cache memory systems (e.g., SSD cache memory system 200) is that these systems may not allow for data stored within the SSD cache memory system 200 to be directly updated or overwritten, thus requiring an erase operation to be performed prior to writing new data. And when erasing data from SSD cache memory system 200, this data may need to be erased in predefined portions that also have a minimum defined size. Typically, the minimum size when erasing data from SSD cache memory system 200 is substantially larger than the minimum size when writing data to SSD cache memory system 200.

For example, erase block 206 (i.e., the minimum defined portion when erasing data from SSD cache memory system 200) may have a size of 256 kilobytes, while cache pages 208, 210, 212, 214, 216, 218 (i.e., the minimum defined portion when writing data to SSD cache memory system 200) may have a size of 4 kilobytes.

Continuing with the above-stated example, cache management process 10 may write 302 a first of the plurality of data streams (e.g., data stream 202) to a first portion of SSD cache memory system 200. For example, cache management process 10 may receive data via data stream 202 and may write 302 this data into erase block 206, one cache page (e.g., cache pages 208, 210, 212, 214, 216, 218) at a time. In the event that the write operation concerns less than 4 kilobyte of data, the write operation will be padded to fill up an entire 4 kilobyte cache page. Once an erase block (e.g., erase block 206) has been filled with cache pages (e.g., cache pages 208, 210, 212, 214, 216, 218), cache management process 10 may begin writing 302 data from data stream 202 to a new erase block (e.g., erase block 220).

Further, cache management process 10 may write 304 a second of the plurality of data streams (e.g., data stream 204) to a second portion of SSD cache memory system 200. For example, cache management process 10 may receive data via data stream 204 and may write 304 this data into erase block 222, one cache page (e.g., cache pages 224, 226, 228, 230, 232, 234) at a time. As with data stream 202, in the event that the write operation concerns less than 4 kilobyte of data, the write operation will be padded to fill up an entire 4 kilobyte cache page. Once an erase block (e.g., erase block 222) has been filled with cache pages (e.g., cache pages 224, 226, 228, 230, 232, 234), cache management process 10 may begin writing 304 data from data stream 204 to a new erase block (e.g., erase block 236).

While the above discussion visually illustrates each erase block as including six cache pages, this is for illustrative purposes only and is not intended to be a limitation of this disclosure. For example and as discussed above, a typical cache page has a size of 4 kilobytes while a typical erase block has a size of 256 kilobytes. Accordingly, each erase block may actually include sixty-four cache pages. However, for illustrative clarity, they are shown to include only six cache pages.

The above-described procedure will be repeated, wherein additional cache pages are written 302, 304 for both data streams (e.g., data streams 202, 204) and additional erase block (e.g., erase blocks 238, 240) will be generated and filled with these newly created cache pages.

As SSD cache memory system 200 has a finite quantity of memory available, data will eventually need to be overwritten within SSD cache memory system 200. Further and as discussed, one of the challenges of using SSD cache memory systems (e.g., SSD cache memory system 200) is that these systems may not allow for data stored within the SSD cache memory system 200 to be updated or overwritten, thus requiring an erase operation to be performed prior to writing new data, wherein this may only be erased (in this example) one erase block at a time. Accordingly and when required, cache management process 10 may erase 306 the first portion (e.g., erase block 206) of SSD cache memory system 200.

As discussed above, since each of data streams 202, 204 is from a unique and distinct user (e.g., users 46, 48 respectively), each of these data streams (e.g., data streams 202, 204) includes data that has similar "attributes", in that the data within a particular data stream may have a similar "time of life". Accordingly and for example:

Cache management process 10 may write 302 the data within data stream 202 into cache pages 208, 210, 212, 214, 216, 218 within erase block 206, wherein all of that data may get destaged together into a backend storage system, thus allowing all of erase block 206 to be erased with no need for any remaining valid data to be copied to a different erase block within SSD cache memory system 200.

Similarly and in a parallel write operation, cache management process 10 may write 304 the data within data stream 204 into cache pages 224, 226, 228, 230, 232, 234 within erase block 222, wherein all of that data may get destaged together into a backend storage system, thus allowing all of erase block 222 to be erased with no need for any remaining valid data to be copied to a different erase block within SSD cache memory system 200.

Further, cache management process 10 may write 302, 304 data (associated with data streams 202, 204) at independent rates at different times, since cache management process 10 is writing the data from each data stream (e.g., data streams 202, 204) to independent erase blocks (e.g., erase blocks 206, 222, respectively) so there is never a mixing of the data included within data stream 202 and data stream 204 on the same erase block, thus allowing full erase blocks to be fully utilized by each data stream and fully reclaimed (erased) when the copying of the data to the backend storage system is complete.

However and prior to erasing 306 the first portion (e.g., erase block 206) of SSD cache memory system 200, cache management process 10 may write 308 any uncommitted data within the first portion (e.g., erase block 206) of SSD cache memory system 200 to the backend storage system. As discussed above, SSD cache memory system 200 (e.g., frontend cache memory system 122 and/or backend cache memory system 124) may be configured as a write-through cache (e.g., wherein storage processor 100 immediately writes content to the backend storage system) or as a write-back cache (e.g., wherein storage processor 100 subsequently writes content to the backend storage system).

According and if SSD cache memory system 200 is configured as a write-back cache memory system, prior to erasing 306 the first portion (e.g., erase block 206) of SSD cache memory system 200, cache management process 10 may write 308 any uncommitted data within the first portion (e.g., erase block 206) of SSD cache memory system 200 to the backend storage system. In this particular example, backend storage system may be e.g., data array 112 when SSD cache memory system 200 is frontend cache memory system 122 and may be the plurality of storage targets (e.g. storage targets 102, 104, 106, 108, 110) when SSD cache memory system 200 is backend cache memory system 124.

Additionally and prior to erasing 306 the first portion of the SSD cache memory system, cache management process 10 may relocate 310 any currently-utilized data within the first portion (e.g., erase block 206) of SSD cache memory system 200 to another portion of SSD cache memory system 200. For example, assume for illustrative purposes that the data within cache page 216 is hot, in that it is repeatedly being accessed. In the event that erase block 206 is erased, the data within cache page 216 will be lost and (if needed again) will need to be retrieved from data array 112 (a computational expensive operation). Accordingly, cache page 216 may be relocated to e.g., erase block 240, in that cache page 216 is copied to erase block 240 prior to erasing 306 the first portion (e.g., erase block 206) of SSD cache memory system 200.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a plurality of data streams associated with a plurality of users on an SSD cache memory system associated with a backend storage system;
   writing a first of the plurality of data streams associated with a first user to a first portion of the SSD cache memory system, wherein the first portion of the SSD cache memory system includes a first erase block within the SSD cache memory system, wherein the first of the plurality of data streams associated with the first user to the first portion of the SSD cache memory system is collectively destaged into the backend storage system, wherein writing the first of the plurality of data streams includes padding the writing of the first of the plurality of data streams to fill the at least one cache page of the first group of cache pages relative to the first erase block;
   writing a second of the plurality of data streams associated with a second user to a second portion of the SSD cache memory system, wherein the second portion of the SSD cache memory system includes a second erase block within the SSD cache memory system, wherein the second of the plurality of data streams associated with the second user to the second portion of the SSD cache memory system is collectively destaged into the backend storage system, wherein writing the second of the plurality of data streams includes padding the writing of the second of the plurality of data streams to fill at least one cache page of a second group of cache pages relative to the second erase block, and wherein no portion of the data comprising the second portion of the SSD cache memory system is a part of the first portion of the SSD cache memory system;
   erasing the first portion of the SSD cache memory system; and
   prior to erasing the first portion of the SSD cache memory system, relocating any currently-utilized data within the first portion of the SSD cache memory system to another portion of the SSD cache memory system, such that at least one cache page of a first group of cache pages relative to the first erase block within the SSD cache memory system is copied to an additional erase block associated with the another portion of the SSD memory system prior to erasing the first portion of the SSD cache memory system.

2. The computer-implemented method of claim 1 further comprising:
   prior to erasing the first portion of the SSD cache memory system, writing any uncommitted data within the first portion of the SSD cache memory system to the backend storage system.

3. The computer-implemented method of claim 1 wherein writing the second of the plurality of data streams associated with the second user to the second portion of the SSD cache memory system is completed at an independent rate and a different time from writing the first of the plurality of data streams associated with the first user to the first portion of the SSD cache memory system.

4. The computer-implemented method of claim 1 wherein after the first erase block is filled with the first group of cache pages, writing the first of the plurality of data streams includes writing the first of the plurality of data streams into a first new erase block.

5. The computer-implemented method of claim 1 wherein after the second erase block is filled with the second group of cache pages, writing the second of the plurality of data streams includes writing the second of the plurality of data streams into a second new erase block.

6. A computer program product residing on a non-transitory computer readable medium having a plurality of instructions stored thereon which, when executed by a processor, cause the processor to perform operations comprising:
   receiving a plurality of data streams associated with a plurality of users on an SSD cache memory system associated with a backend storage system;
   writing a first of the plurality of data streams associated with a first user to a first portion of the SSD cache memory system, wherein the first portion of the SSD cache memory system includes a first erase block within the SSD cache memory system, wherein the first of the plurality of data streams associated with the first user to the first portion of the SSD cache memory system is collectively destaged into the backend storage system, wherein writing the first of the plurality of data streams includes padding the writing of the first of the plurality of data streams to fill the at least one cache page of the first group of cache pages relative to the first erase block;
   writing a second of the plurality of data streams associated with a second user to a second portion of the SSD cache memory system, wherein the second portion of the SSD cache memory system includes a second erase block within the SSD cache memory system, wherein the second of the plurality of data streams associated with the second user to the second portion of the SSD cache memory system is collectively destaged into the backend storage system, wherein writing the second of the plurality of data streams includes padding the writing of the second of the plurality of data streams to fill at least one cache page of a second group of cache pages relative to the second erase block, and wherein no portion of the data comprising the second portion of the SSD cache memory system is a part of the first portion of the SSD cache memory system;

erasing the first portion of the SSD cache memory system;

prior to erasing the first portion of the SSD cache memory system, relocating any currently-utilized data within the first portion of the SSD cache memory system to another portion of the SSD cache memory system, such that at least one cache page of a first group of cache pages relative to the first erase block within the SSD cache memory system is copied to an additional erase block associated with the another portion of the SSD memory system prior to erasing the first portion of the SSD cache memory system.

7. The computer program product of claim 6 further comprising:

prior to erasing the first portion of the SSD cache memory system, writing any uncommitted data within the first portion of the SSD cache memory system to the backend storage system.

8. The computer program product of claim 6 wherein writing the second of the plurality of data streams associated with the second user to the second portion of the SSD cache memory system is completed at an independent rate and a different time from writing the first of the plurality of data streams associated with the first user to the first portion of the SSD cache memory system.

9. The computer program product of claim 6 wherein after the first erase block is filled with the first group of cache pages, writing the first of the plurality of data streams includes writing the first of the plurality of data streams into a first new erase block.

10. The computer program product of claim 6 wherein after the second erase block is filled with the second group of cache pages, writing the second of the plurality of data streams includes writing the second of the plurality of data streams into a second new erase block.

11. A computing system including a processor and memory configured to perform operations comprising:

receiving a plurality of data streams associated with a plurality of users on an SSD cache memory system associated with a backend storage system;

writing a first of the plurality of data streams associated with a first user to a first portion of the SSD cache memory system, wherein the first portion of the SSD cache memory system includes a first erase block within the SSD cache memory system, wherein the first of the plurality of data streams associated with the first user to the first portion of the SSD cache memory system is collectively destaged into the backend storage system, wherein writing the first of the plurality of data streams includes padding the writing of the first of the plurality of data streams to fill the at least one cache page of the first group of cache pages relative to the first erase block;

writing a second of the plurality of data streams associated with a second user to a second portion of the SSD cache memory system, wherein the second portion of the SSD cache memory system includes a second erase block within the SSD cache memory system, wherein the second of the plurality of data streams associated with the second user to the second portion of the SSD cache memory system is collectively destaged into the backend storage system, wherein writing the second of the plurality of data streams includes padding the writing of the second of the plurality of data streams to fill at least one cache page of a second group of cache pages relative to the second erase block, and wherein no portion of the data comprising the second portion of the SSD cache memory system is a part of the first portion of the SSD cache memory system;

erasing the first portion of the SSD cache memory system; and prior to erasing the first portion of the SSD cache memory system, relocating any currently-utilized data within the first portion of the SSD cache memory system to another portion of the SSD cache memory system, such that at least one cache page of a first group of cache pages relative to the first erase block within the SSD cache memory system is copied to an additional erase block associated with the another portion of the SSD memory system prior to erasing the first portion of the SSD cache memory system.

12. The computing system of claim 11 further configured to perform operations comprising:

prior to erasing the first portion of the SSD cache memory system, writing any uncommitted data within the first portion of the SSD cache memory system to the backend storage system.

13. The computing system of claim 11 wherein after the first erase block is filled with the first group of cache pages, writing the first of the plurality of data streams includes writing the first of the plurality of data streams into a first new erase block.

14. The computing system of claim 11 wherein after the second erase block is filled with the second group of cache pages, writing the second of the plurality of data streams includes writing the second of the plurality of data streams into a second new erase block.

* * * * *